Patented Nov. 6, 1934

1,979,519

UNITED STATES PATENT OFFICE 1,979,519

PREPARATION OF ORGANIC ACIDS

John C. Woodhouse, Wilmington, Del., assignor, by mesne assignments, to E. I. du Pont de Nemours & Company, Wilmington, Del., a corporation of Delaware No Drawing. Application February 28, 1931, Serial No. 519,274

14 Claims. (Cl. 260—116)

This invention relates to a process for the formation of organic compounds and particularly to the preparation of monocarboxylic acids by the interaction of aliphatic alcohols and carbon monoxide in the presence of a catalyst.

It is known that organic acids and esters can be prepared by the interaction, in the vapor or liquid phase, of organic compounds with the oxides of carbon. For example, it has been shown that by the condensation of methyl alcohol with carbon monoxide in the presence of a suitable catalyst acetic acid, methyl acetate, and methyl formate may be prepared in proportions which are governed by the particular operating conditions. Acids have likewise been prepared from methane and carbon monoxide, from carbon monoxide and water vapor, and from ethers and carbon monoxide. Investigators have experienced considerable difficulty in their attempts to find, for these reactions, a catalyst which under given operating conditions would produce a good yield of the acid or other compound desired. Some of the catalysts which have been suggested include the hydrogenating and hydrating catalysts alone or in combination, metal acetate catalysts which split off acetic acid under 450° C., and acid catalysts, such as phosphoric acid and its acid salts.

There are numerous disadvantages in the employment of the before-mentioned catalysts, however. For instance, when the hydrogenating and hydrating catalysts are employed particularly if acetic acid is the desired end product, but low yields of that acid result. With the metal acetate catalysts which decompose and split off acetic acid, frequent reactivation is required which renders their use uneconomical from the commercial standpoint. When the liquid acid catalysts are utilized, difficulties in supporting them and maintaining their initial activity are encountered.

An object of this invention is to provide a process for the preparation of higher molecular weight organic compounds thru the introduction of carbon monoxide into the lower molecular weight organic compounds. A further object of this invention is to provide a process for the preparation of monocarboxylic acids by the condensation of aliphatic alcohols with carbon oxides in the presence of a catalyst. Another object of this invention is to provide a process for the preparation of acids having the structural formulæ —$C_nH_{2n+1}COOH$—from alcohols having the structural formulæ—$C_nH_{2n+1}OH$—by subjecting the alcohols to the action of carbon monoxide in the presence of a promoted charcoal catalyst. A still further object of this invention is to provide a process for the preparation of acetic acid by the interaction of methanol and carbon monoxide in the presence of a charcoal catalyst promoted with acidic oxides. Other objects will hereinafter appear.

According to the present invention organic acids are prepared by the interaction of the aliphatic alcohols in the presence of carbon monoxide by passing these vaporized alcohols together with the carbon monoxide over an active charcoal catalyst promoted with an acidic oxide of sub groups B of the 4th, 5th, and 6th groups of the periodic table, and especially the oxides of arsenic, silicon, phosphorus, selenium, or mixtures and/or compounds thereof. The thus promoted charcoal catalyst may be supported or not, altho in some instances it is advantageous to support these promoted charcoal catalysts on silica gel, kieselguhr or other similar inert material.

The thus promoted charcoal catalyst is not to be confused with acidic oxides supported on charcoal. In the latter case, the catalytic effect of the charcoal is negligible, due to the fact that its surface has been coated with a contiguous covering of the acidic oxide which alone is acting as the catalyst for the reaction. On the other hand, when using charcoal as a catalyst and promoted, in accord with the present invention, the charcoal is the dominating influence in the catalyst and the surface and configuration of the charcoal, per se, aided by the acidic oxide, results in a catalyst which has a much greater activity for the alcohol carbon monoxide reaction than, for example, the same acidic oxide supported on the charcoal.

The alcohol-carbon monoxide reactions which can be accelerated by the above described catalysts may be expressed as follows:

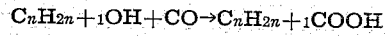

$$C_nH_{2n+1}OH + CO \rightarrow C_nH_{2n+1}COOH$$

In accordance with the particular operating conditions, it will be found that, in some instances, the acid may not be formed directly in the free state, but may be produced as an ester by condensation of the acid formed with the particular alcohol used in the process, as indicated below:

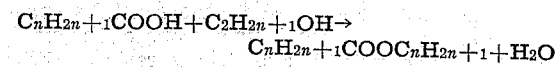

$$C_nH_{2n+1}COOH + C_2H_{2n+1}OH \rightarrow$$
$$C_nH_{2n+1}COOC_nH_{2n+1} + H_2O$$

The alcohol used may be replaced, if desired, wholly or partly by the corresponding alkyl ethers of the alcohol, such as dimethyl ether, or the mixed alkyl ethers, the alkyl esters, or other compounds containing one or more hydrolyzable alkoxy groups.

The synthesis can generally be efficiently carried out under the following operating conditions. The pressure may vary from approximately 25 atmospheres to 900 atmospheres or higher with the preferable operating range in the neighborhood of 350–700 atmospheres. The temperature within the reaction zone is quite critical as it determines to a large extent the product obtained. For example, when the methanol-carbon monoxide reaction is conducted at temperatures below 300° C. a low yield of methyl acetate will be obtained. While, on the other hand at temperatures above 300° C. the yield of methyl acetate will increase with a corresponding decrease in the proportion of the parasitic products.

The carbon monoxide used may be obtained from various commercial sources, such, for example, as from water gas, producer gas, coke oven gas, and the like, but to obtain products of the highest degree of purity it is preferable to remove from such commercial gases the objectionable constituents such as sulfur compounds, metal carbonyls, etc.

The presence of inert gases in the alcohol-carbon monoxide mixture is sometimes desirable. Nitrogen, for instance, has little deleterious effect on the reaction or yield and, in fact, may be advantageously used in order to aid in the temperature control and to prevent too great a conversion of the alcohol and carbon monoxide on one pass through the conversion apparatus. Other strictly inert gases will usually act similarly to nitrogen. It is, of course, understood that instead of introducing methanol itself into the reaction chamber substances or mixtures of substances which decompose to form alcohols or esters may be employed, but generally I prefer to introduce methanol directly into the gas stream leading to the converter.

My process can be conveniently carried out by passing purified carbon monoxide into methanol preferably containing water, maintained at such a temperature that the issuing gases will have the requisite proportion of methanol, carbon monoxide and water vapor. I have found that a gaseous composition, containing an excess of carbon monoxide over the methanol vapor, will give a good yield of acetic acid and ester on one pass through a converter containing my catalyst,— the temperature of the reaction chamber being maintained at approximately 300° C. and the pressure held in the neighborhood of 350 atmospheres.

The promoted charcoal catalyst may be prepared by an intimate mixing of activated charcoal with the desired proportion of an acidic oxide of sub groups B of the 4th, 5th, or 6th groups of the periodic table. For example, a finely comminuted charcoal is mixed with 2–10% of arsenic oxide which is likewise in comminuted form. After a thorough mixing of the two the resultant composition is pilled, in the usual type of pilling machine or it may be briquetted, formed into granules or otherwise treated to put it in a suitable shape for catalyzing the reaction. It wil be realized that by so preparing the charcoal catalyst there is exposed to the reactant gases a proportion of charcoal surface and of the oxide surface substantially equal to the ratio of these ingredients employed.

Not only can methanol be catalyzed in the presence of carbon monoxide and my catalyst to acetic acid or the condensation product of the acetic acid with methanol, i. e. methyl acetate, but the higher alcohols, such as ethyl alcohol, propyl alcohol, butyl alcohol, and even the higher molecular weight alcohols, such for example as hexyl alcohol or octyl alcohol, may be similarly converted into an acid having correspondingly one more carbon atom than the alcohol treated. In fact, my process and catalyst may be employed with any of the monohydric alcohols, providing these alcohols volatilize without decomposition. When converting the higher aliphatic alcohols, some of which are not water soluble, and particularly if water is desired in the reaction, it is preferable to introduce the alcohol and water into the carbon monoxide as a vapor or spray. Any other suitable procedure may be employed, however, for intimately commingling the vapors of the alcohol and water with the oxide of carbon. When preparing products from the higher molecular weight compounds I may utilize in lieu of the alcohol the ether or ester thereof, the use of which will modify, to some extent, the type of product obtained.

I will now describe a specific embodiment of my process, but it will be understood that the details therein given and the compounds employed, either as reactants or catalysts, in no way restrict the scope of this invention, but merely illustrate one manner in which my process may be carried out.

A gaseous mixture containing 85% carbon monoxide and 5% each of methanol, water vapor, and hydrogen, is passed over an arsenic oxide promoted charcoal catalyst prepared as indicated above, under a pressure of 700 atmospheres and at a temperature of 300° C. The catalyst is disposed in a suitable chamber for the carrying out of exothermic gaseous reactions. The condensate obtained upon the cooling of the converted gases contains a high percentage of free acetic acid together with some methyl acetate and unconverted methanol.

The apparatus, which may be employed for conducting these reactions, may be of any conventional type and preferably one in which the temperature of the exothermic reaction can be readily controlled at the optimum value. Owing to the corrosive action of acetic acid, the interior of the converter and apparatus leading therefrom should preferably be protected. This may be accomplished by using glass or glass-lined apparatus or by plating the inner surfaces thereof with chromium or silver, or using for the construction of this equipment acid resisting high alloy steels containing, for example, high molybdenum, cobalt, tungsten, chromium, manganese, or nickel content.

From a consideration of the above specification it will be realized that any process in which a carbon oxide is combined with an organic compound giving a product containing a negative radical of an aliphatic acid, and particularly those in which monohydric alcohols are converted to monocarboxylic acids, will come within the scope of this invention when such reactions are accelerated in the presence of a charcoal catalyst promoted with an acidic oxide of sub groups B of the 4th, 5th and 6th groups of the periodic table.

I claim:

1. A process for the preparation of aliphatic organic acids which comprises contacting a compound selected from the group consisting of monohydroxy aliphatic alcohols, the alkyl ethers and the alkyl esters, with an activated charcoal catalyst promoted with an acidic oxide substantially not reducible under the conditions of operation selected from the group of oxides consisting of sub groups B of the 4th, 5th, and 6th groups of the periodic table in the presence of carbon monoxide at reacting temperature.

2. A process for the preparation of aliphatic organic acids which comprises contacting an aliphatic alcohol which is not substantially decomposed when vaporized with an activated charcoal catalyst promoted with an acidic oxide substantially not reducible under the conditions of operation selected from the group of oxides consisting of sub groups B of the 4th, 5th, and 6th groups of the periodic table in the presence of carbon monoxide at reacting temperature.

3. A process for the preparation of aliphatic organic acids which comprises contacting a monohydroxy aliphatic alcohol which is not substantially decomposed when vaporized with a supported activated charcoal catalyst promoted with an acidic oxide substantially not reducible under the conditions of operation selected from the group of oxides consisting of sub groups B of the 4th, 5th and 6th groups of the periodic table in the presence of carbon monoxide at reacting temperature.

4. A process for the preparation of acetic acid which comprises contacting methanol with an activated charcoal catalyst promoted with an acidic oxide substantially not reducible under the conditions of operation selected from the group of oxides consisting of sub groups B of the 4th, 5th and 6th groups of the periodic table in the presence of carbon monoxide at reacting temperature.

5. A process for the preparation of aliphatic organic acids which comprises passing carbon monoxide through an aqueous monohydroxy aliphatic alcohol solution and subsequently contacting the resultant vapor at an elevated temperature and pressure with an activated charcoal catalyst promoted with an acidic oxide substantially not reducible under the conditions of operation selected from the group of oxides consisting of sub groups B of the 4th, 5th, and 6th groups of the periodic table.

6. A process for the preparation of acetic acid which comprises passing methanol and carbon monoxide at an elevated temperature and pressure over an activated charcoal catalyst promoted with an acidic oxide substantially not reducible under the conditions of operation selected from the group of oxides consisting of sub groups B of the 4th, 5th, and 6th groups of the periodic table.

7. A process for the preparation of acetic acid which comprises passing methanol and carbon monoxide at an elevated temperature and pressure over a supported activated charcoal catalyst promoted with an acidic oxide substantially not reducible under the conditions of operation selected from the group of oxides consisting of sub groups B of the 4th, 5th, and 6th groups of the periodic table.

8. A process for the preparation of acetic acid which comprises passing methanol and carbon monoxide at an elevated temperature and pressure over an activated charcoal catalyst promoted with arsenic oxide.

9. A process for the preparation of acetic acid which comprises passing methanol and carbon monoxide at an elevated temperature and pressure over an activated charcoal catalyst promoted with an oxide of phosphorus.

10. A process for the preparation of acetic acid which comprises passing methanol and carbon monoxide at an elevated temperature and pressure over an activated charcoal catalyst promoted with selenium oxide.

11. In a vapor phase process for the preparation of aliphatic organic acids from compounds containing at least one hydrolyzable alkoxy group and carbon monoxide, the step which comprises effecting the reaction in the presence of an activated charcoal catalyst promoted with a substantially non-volatile acidic oxide selected from the group of oxides consisting of sub-groups B of the 4th, 5th and 6th groups of the periodic table.

12. In a vapor phase process for the preparation of saturated aliphatic monocarboxylic acids from saturated monohydroxy aliphatic alcohols and carbon monoxide, the step which comprises effecting the reaction in the presence of an activated charcoal catalyst promoted with a substantially non-volatile acidic oxide selected from the group of oxides consisting of sub-groups B of the 4th, 5th and 6th groups of the periodic table.

13. In a process for the preparation of acetic acid from methanol and carbon monoxide in the vapor phase, the step which comprises effecting the reaction in the presence of an activated charcoal catalyst promoted with an oxide of phosphorus.

14. A process for the preparation of aliphatic organic acids which comprises contacting an aliphatic alcohol which is not substantially decomposed when vaporized with an activated carbon catalyst promoted with an acidic oxide, substantially not reducible under the conditions of operation, selected from the group of oxides consisting of sub-groups B of the 4th, 5th, and 6th groups of the periodic table in the presence of carbon monoxide at reacting temperature.

JOHN C. WOODHOUSE.